UNITED STATES PATENT OFFICE.

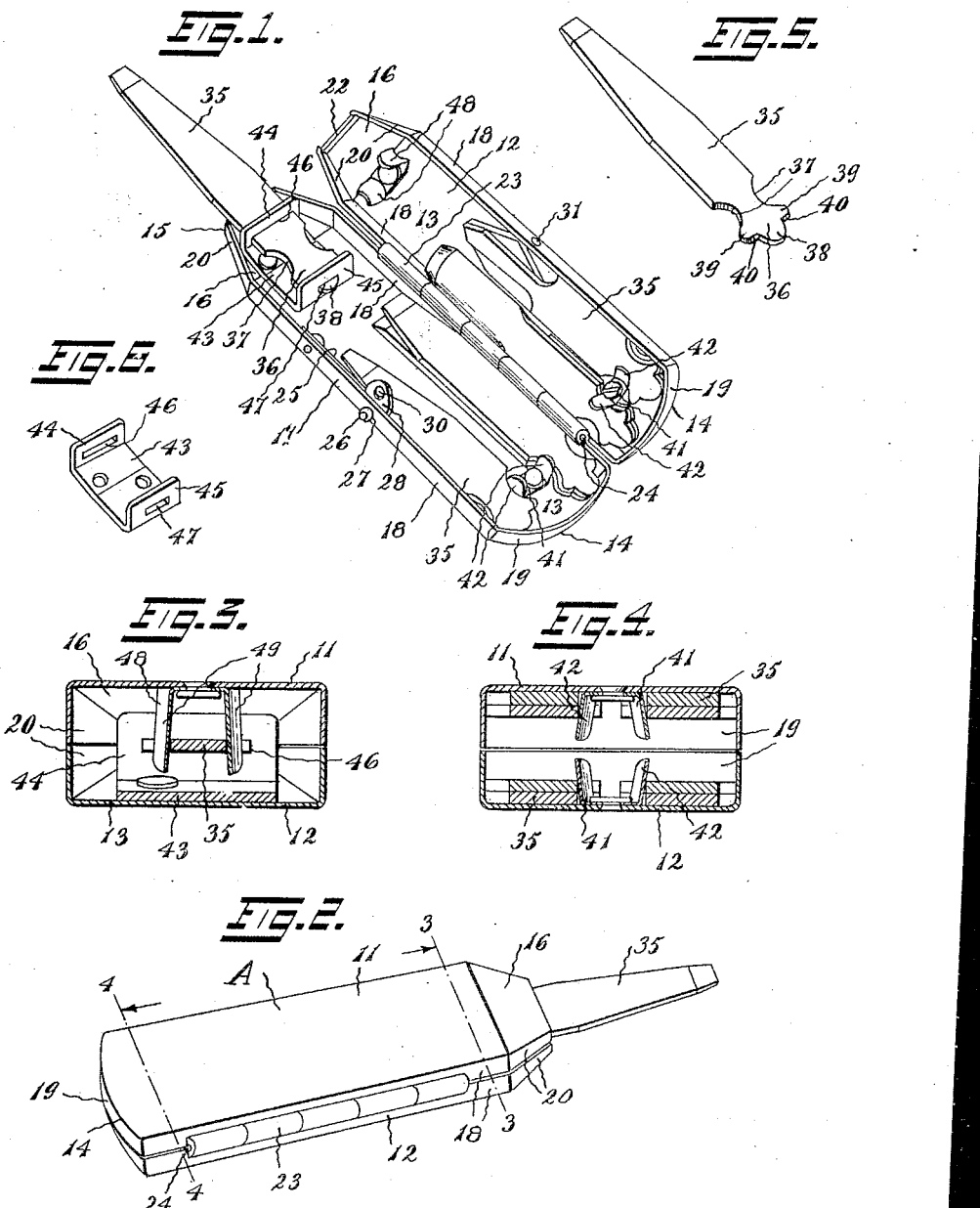

EWING M. FORBES, OF CHAPPAQUA, NEW YORK, ASSIGNOR TO WILLIAM W. MOUNTAIN, OF FLINT, MICHIGAN.

TOOL AND TOOL-HOLDER.

1,309,281.   Specification of Letters Patent.   Patented July 8, 1919.

Application filed December 20, 1918. Serial No. 267,687.

*To all whom it may concern:*

Be it known that I, EWING M. FORBES, a citizen of the United States, residing in Chappaqua, in the county of Westchester and State of New York, have invented certain new and useful Improvements in Tools and Tool-Holders, of which the following is a specification.

This invention relates to tools and tool holders in general and more especially to those known as pocket tool kits.

Among the main objects of the present invention, it is aimed to provide a tool holder composed of flat stock, forming a housing for all or such of the tools of flat stock that are not in use, and a handle for the tool to be used.

Another object of the invention is to provide a tool holder comprising two sections pivotally connected to one another, to close and form a housing for all or such of the tools that are not in use and also when so closed to form a handle for the tool to be used.

A still further object of the invention is to provide heads on the tools, and means on the tool holder that coöperate with one another either to retain the tools in proper place when the tool holder serves as a housing or casing for the tools, or when the tool holder serves as a handle for the tool to be used.

A special feature of the present invention is the provision of a sectional tool holder, the sections of which are provided with means that coöperate with one another to form a chuck for the tools.

These and other features, capabilities and advantages of the invention will appear from the subjoined detail description of one specific embodiment of the same illustrated in the accompanying drawings in which—

Figure 1 is a perspective view showing the tool holder open with a tool in place for using the tool with the tool holder as a handle.

Fig. 2 is a similar perspective showing the tool holder closed.

Fig. 3 is a section on the line 3—3 of Fig. 2.

Fig. 4 is a section on the line 4—4 of Fig. 2.

Fig. 5 is a perspective of one of the tools.

Fig. 6 is a detached perspective of a portion of the chuck forming means.

In the embodiment illustrated there is shown a tool holder A preferably composed of flat stock and comprising two elongated box-like structures or sections 11 and 12 which correspond to one another so that their edges or side walls may register with one another to assume the closed position of the tool holder when they form a closed pocket for the tools. The sections 11 and 12 as shown each preferably comprises a floor member 13 rounded at its rear end 14, and tapering at its front end to terminate in a diminished end 15, the portion 16 of the floor member defined by the tapering sides and diminished end flaring upwardly. The floor member 13 is provided with a wall member along its edges as shown, embracing the side wall portions 18, the rear rounded wall portion 19, and the front tapering wall portions 20 and the diminished wall portion 22 at the diminished end 15 of the floor member.

As shown in Fig. 2, the sections 11 and 12 when the side walls thereof register with one another, form a casing having a tapering front portion. For pivotally connecting the sections to one another, portions adjacent walls 18 of the sections 11 and 12 are rolled to form a tubular inclosure 23 for the wire 24. The diminished wall portions 22 form an opening or mouth from which the tool to be used extends as shown in Figs. 1 and 2.

For latching the sections to one another in closed position, the free side wall 18 of the section 11 is provided with a spring bar 25 riveted at one end to said side wall 18, having a pin 26 near its other end resiliently projecting through the opening 27 formed in said wall portion 18 and having an ear 28 extending upwardly in which is provided an opening 30 to coöperate with the projection 31 protruding inwardly from the free side wall 18 of the section 12. Thus when the sections have their side walls in engagement, the projection 31 will register with the opening 30 and the tension of the spring bar 25 anchor the sections to one another and when it is desired to open the sections, by exercising pressure on the pin 26, the ear 28 will be withdrawn from the projection 31 and the sections be free to be opened.

The tools 35 are composed of flat stock and each provided with a head 36 to cooperate with the tool holder as hereinafter to be described. Notches 37 are provided to either side of the head 36 and a lip 38 at the extreme end of the head 36 between which lip 38 and the notches 37 are formed the ears 39 which define shoulders 40 to either side of the lip 38.

For securing the tools when not in use in the sections 11 and 12 against displacement, the brackets 41 are provided preferably one secured to the floor member 16 of each section which brackets are provided with upwardly and outwardly flaring prongs 42 which register with notches 37 of the tools 35 to anchor the same in place as shown.

For anchoring the tool to be used in the mouth of the casing, the bracket 43 is secured in the section 11 and adjacent to the diminished wall portion 22. The bracket 43 is provided with two parallel upwardly extending arms 44 and 45, the arm 44 nearest the diminished wall portion 22 having an opening 46 which is longer than, but in alinement with the opening 47 formed in the arm 45. On the section 12 is secured the bracket 48 having the outwardly extending prongs 49. The positions of the brackets 43 and 48 relative to one another and to the sections 11 and 12 is such that the head 36 of the tool may be passed through the opening 46, and its lip 38 through the opening 47, the opening 46 in extent permitting the passage therethrough of such head 36, the opening 47 in extent only permitting the passage of the lip 38 therethrough, the arm 45 serving as an abutment for the ears 39, while the shank of the tool rests on the diminished wall portion 22 of such section 11, and thereupon when the section 12 is closed down upon the section 11, the prongs 49 will register with the notches 37, and the diminished wall portion 22 of the section 12 engage the shank of the tool so that the tool will be locked both against longitudinal and axial displacement and be securely anchored in place for use.

It is obvious that various changes and modifications may be made to the details of the construction without departing from the general spirit of the invention.

I claim:

1. In an apparatus of the character described, the combination of a structure comprising main and cover sections; outer and inner bracket arms secured in said main section and provided respectively with long and short slots; a tool formed with a portion adapted to fit said large slot, a pair of shoulders adapted to abut said inner arm, and an end lip adapted to fit in said short slot; and means adapted to hold said tool in said slots.

2. In an apparatus of the character described, the combination of a structure comprising hinged main and cover sections; outer and inner bracket arms secured in said main section and provided respectively with long and short slots; a tool formed with a portion adapted to fit said large slot, a pair of shoulders adapted to abut said inner arm, an end lip adapted to fit in said short slot, and a lateral notch; and a retaining bracket fixed to said cover section and having a part adapted to fit in said notch when the cover sections are closed together.

3. In an apparatus of the character described, the combination of a structure adapted to hold a plurality of tools therein and comprising main and cover sections hinged together at one longitudinal edge; a seat bracket secured to said main section and comprising outer and inner parallel arms provided respectively with long and short horizontal slots; a tool formed with a large intermediate portion adapted to fit said large slot, a pair of lateral shoulders adapted to abut said inner arm, an end lip adapted to fit in said short slot, and a pair of lateral notches; and a retaining bracket secured to said cover section and having prongs adapted to fit in said concaved notches when the cover section is closed.

4. In an apparatus of the character described, the combination of a box-like structure having an open outer end and comprising main and cover sections each comprising a wide body portion and edge flanges, the sections being hinged together at one longitudinal flange edge to permit the sections to open apart; a U-shaped seat bracket comprising a yoke part secured to the outer-end part of the body portion of said main section, and outer and inner arms upstanding in parallel planes transverse to the axis of said structure and provided respectively with long and short horizontal slots alined with each other; a flat tool formed with a large intermediate portion adapted to fit said large slot, a pair of lateral ears adapted to abut said inner arm, an end lip adapted to fit in said short slot, and a pair of lateral notches disposed midway between said arms; and a retaining bracket secured to said cover section and having prongs adapted to fit in said notches when the cover section is closed.

5. In an apparatus of the character described, the combination of a box-like structure having an open diminished outer end and comprising main and cover sections each comprising a wide body portion and upstanding edge flanges, the sections being hinged together at one longitudinal flange edge to permit the sections to open apart; means for holding said sections closed in box-like form; a U-shaped seat bracket comprising a yoke part riveted flat against the outer-end part of the body portion of said main section, and outer and inner arms upstanding in parallel planes transverse to the axis of said structure and provided respectively with long and short horizontal slots axially alined with each other; a flat-stock tool formed with a large intermediate portion adapted to fit said large slot, a pair of lateral ears adapted to abut said inner arm, a rounded end lip adapted to fit in said short slot, and a pair of concaved opposite lateral notches disposed midway between said arms; and a U-shaped retaining bracket riveted to said cover section and having diverging prongs having convexed inner faces adapted to fit in said concaved notches when the cover section is closed.

EWING M. FORBES.

Witnesses:
GUSTAV DREWS,
H. D. PENNEY.

Copies of this patent may be obtained for five cents each, by addressing the "Commissioner of Patents, Washington, D. C."